United States Patent
Smith et al.

(10) Patent No.: US 9,277,263 B2
(45) Date of Patent: Mar. 1, 2016

(54) SYSTEM AND METHOD FOR IN-BAND DELIVERY OF ADVERTISING DECISION DATA

(75) Inventors: Donald Smith, San Ramon, CA (US); Kou-Hoi Liu, San Ramon, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 596 days.

(21) Appl. No.: 12/724,199

(22) Filed: Mar. 15, 2010

(65) Prior Publication Data

US 2011/0225607 A1    Sep. 15, 2011

(51) Int. Cl.
*H04N 21/00* (2011.01)
*H04N 21/2668* (2011.01)
*H04N 21/262* (2011.01)
*H04N 21/433* (2011.01)
*H04N 21/44* (2011.01)
*H04N 21/81* (2011.01)

(52) U.S. Cl.
CPC ..... *H04N 21/2668* (2013.01); *H04N 21/26258* (2013.01); *H04N 21/4331* (2013.01); *H04N 21/44016* (2013.01); *H04N 21/812* (2013.01)

(58) Field of Classification Search
CPC ..... H04N 5/2723; H04N 7/165; H04N 21/00; H04N 21/23424; H04N 21/4331; H04N 21/44016; H04N 21/812
USPC ................................................. 725/32, 35, 36
See application file for complete search history.

(56) References Cited

U.S. PATENT DOCUMENTS

| | | | | |
|---|---|---|---|---|
| 5,424,770 A * | 6/1995 | Schmelzer | | H04N 7/165 348/705 |
| 6,771,644 B1 * | 8/2004 | Brassil | | H04L 12/1895 370/390 |
| 7,979,877 B2 * | 7/2011 | Huber | | G06Q 30/02 725/32 |
| 2005/0015816 A1 * | 1/2005 | Christofalo | | H04N 7/165 725/136 |
| 2006/0075449 A1 * | 4/2006 | Jagadeesan | | G06Q 30/02 725/113 |
| 2007/0283384 A1 * | 12/2007 | Haeuser | | H04N 7/165 725/34 |
| 2008/0225698 A1 * | 9/2008 | Smith | | H04L 12/1863 370/218 |
| 2009/0150930 A1 * | 6/2009 | Sherwin | | G11B 27/031 725/35 |
| 2009/0187941 A1 * | 7/2009 | Smith | | H04L 12/1854 725/35 |

(Continued)

OTHER PUBLICATIONS

IPTV Challenges—AT&T Labs Research, NJ USA Authors: K.K. Ramakrishnan & R. D. Doverspike Date: Feb. 2008 Publisher: IEEE (978-1-55752-855-1).*

(Continued)

*Primary Examiner* — Hunter B Lonsberry
*Assistant Examiner* — Tung T Trinh
(74) *Attorney, Agent, or Firm* — G. Michael Roebuck

(57) ABSTRACT

A system is disclosed for inserting advertising description data into an audio/visual data stream, the system including but not limited to a first server processor in data communication with a first computer program comprising instructions embedded in a computer readable medium, wherein the processor is configured to insert advertising trigger signal data into the audio/visual data stream at a super head office (SHO) and send the audio/visual data stream with trigger signal data to an end user client device; and a second processor at a VHO is configured to receive the audio visual data stream and trigger signal data from the first processor, generate a per-VHO multicast data stream and inject advertising description data into the per-VHO multicast stream upon detection of the advertising trigger data in the audio/visual data stream and send the per-VHO multicast data stream from the VHO to the end user client device.

20 Claims, 4 Drawing Sheets

(56) References Cited

U.S. PATENT DOCUMENTS

2009/0199236 A1* 8/2009 Barrett .................. H04N 7/165
                                                          725/36
2009/0217318 A1* 8/2009 VerSteeg ................ G06Q 30/02
                                                          725/32

OTHER PUBLICATIONS

IPTV Challenges—AT&T Labs Research, NJ USA Authors: K. K. Ramakrishnan & R. D. Doverspike Date: Feb. 2008 Publisher: IEEE (978-1-55752-855-1).*

* cited by examiner

SYSTEM AND METHOD FOR IN-BAND DELIVERY OF ADVERTISING DECISION DATA

FIELD OF THE DISCLOSURE

The present disclosure relates to the insertion of targeted advertising into a video data stream.

BACKGROUND OF THE DISCLOSURE

Targeted advertisements have historically been mailed to large targeted geographic areas such as a particular city, so that regional advertisers reach only persons who are deemed by the advertiser as most likely to be responsive to their advertisements. Advertisements are a component in digital video services, including live or pre-recorded broadcast television TV, special or pay-per-view programming, video on demand (VOD), and other content choices available to subscribers. Advertisers now target video subscribers with advertisements based on demographics for regions in which the subscriber resides.

DETAILED DESCRIPTION

Figure 1:
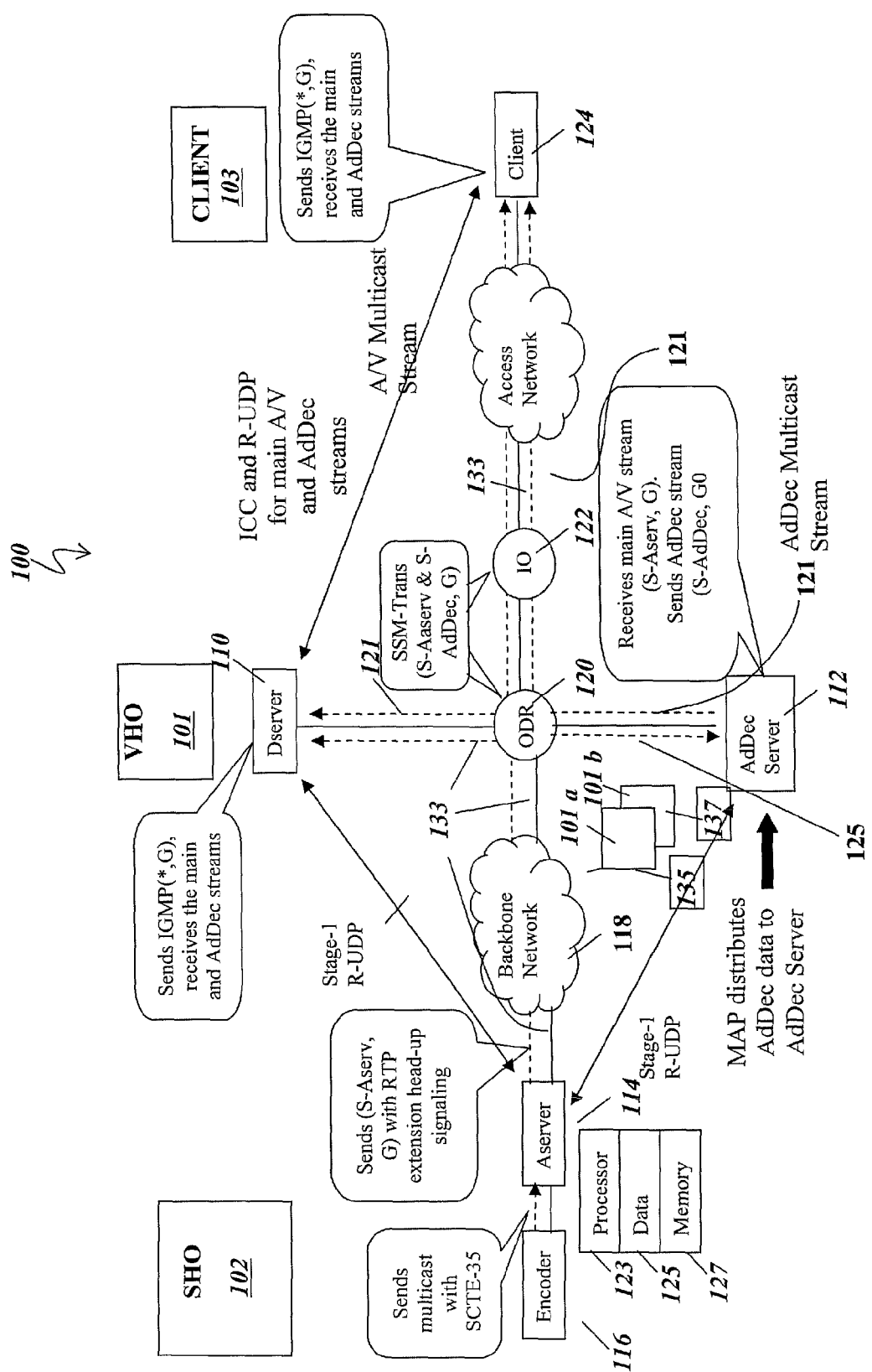
FIG. 1 depicts an illustrative embodiment of a system for delivering advertising data.

The present disclosure describes an illustrative embodiment of a system and method in which Internet Protocol Television (IPTV) advertising decision data (hereinafter "AdDec" data) is generated separately for each VHO, and carried in separate per-VHO AdDec multicast data streams (hereinafter AdDec streams or AdDec data streams). In an illustrative embodiment, these AdDec streams are received by Microsoft Mediaroom end user device clients (set top boxes (STBs) and DVRs), however, the AdDec streams can also be received and processed by a computer configured to perform some or all of the functions of the system and method described herein.

The end user device clients use the AdDec data to determine which advertisements or "ads" are to be inserted into each live IPTV program during each advertising break, and the order of those ads, such that the advertising revenue is substantially maximized. The AdDec stream received by each client is in addition to the TV program's main A/V stream into which the ads are to be inserted. The AdDec stream is sent a short amount of time, before an advertising break, in order to allow the client hardware/firmware and/or software program configured on a dedicated processor to prepare for advertising insertion processing, and to allow the end user client device to inform a digital video recorder (DVR), which in a particular illustrative embodiment, stores the advertisements to be inserted, to prepare to send the advertisements to the client to be spliced in (when the client is not the DVR itself).

The present disclosure describes delivery of per-VHO AdDec data via IP multicast and operation of Microsoft Media room's Instant Channel Change (ICC) and R-UDP (for recovery of lost packets), in an illustrative embodiment. The present disclosure describes an illustrative embodiment using Microsoft's Mediaroom Advertising Platform (MAP) to support an end user client device, for example, an STB which performs advertising data insertion. This is commonly referred to as STB Ad Insertion (SAI). In an illustrative embodiment, the MAP is directed to insert advertising decision (AdDec) data into live IPTV multicast streams for delivery to clients, which is referred to herein as in-band delivery. AdDec data includes information about which advertising spots or advertisements (ads) are to inserted to be presented to subscribers according to their advertising zones (geographic locations) and/or demographics.

As currently specified in Microsoft MAP, the AdDec data of a particular IPTV channel is inserted into an audio/video (A/V) multicast data stream of that IPTV channel by the Aserver, in the SHO, and that stream is then multicast downstream to all the VHOs. Thus, a single A/V data stream for the IPTV channel carries the totality of all the AdDec data required for all the VHOs in an IPTV network. However, there may be not enough space (or bandwidth) available in the IPTV A/V data stream to carry the AdDec data for all the VHOs in the IPTV network. Thus, an illustrative embodiment provides for insertion of advertisements that are customized according to each particular VHO in the IPTV network, each VHO having its own advertising zones (such as zipcode+4). Customization according to demographics is also supported.

IPTV network system bandwidth limitations can impose severe restrictions on the customization of AdDec data according to each VHO, or it would severely restrict the number of VHOs that could participate in STB ad insertion. This in turn would result in significant loss of advertising revenue. Moreover, out-of-band delivery of AdDec data to clients based on client requests and server response protocols can require either more processing power in the STBs and DVRS than may be currently available, or may involve more complex protocols involving AdDec data being stored in and delivered by MicroSoft Mediaroom Dservers, that is, additional servers provided and configured in an IPTV system. Simultaneous requests from all or many clients in an IPTV network can hit the IPTV servers at the same time. Thus, the out of band solution may not be scalable unless many new IPTV network servers are added to handle these simultaneous requests. Providing more processing power in the STBs and DVRs would require replacing that equipment, which would be very expensive. The illustrative embodiment disclosed herein will potentially increase the scalability of delivery of AdDec data, will run on existing client hardware, and does not require complex new protocols.

In some known systems, for example, Microsoft's MAP, the system inserts AdDec data into the live IPTV multicast A/V streams for delivery to end user client devices such as STBs, DVRs, cell phones or other mobile devices. This data is inserted into each live IPTV A/V stream by an Aserver in the IPTV network SHO, and is then multicast downstream to all the IPTV network VHOs and ultimately to the clients. This means that each VHO receives the same AdDec data. However, there is a limited amount of space (or bandwidth) available in the IPTV network A/V data stream to carry this data (it is carried in an extension of the RTP header). The amount of space may not be sufficient to carry all the required AdDec data for all the VHOs in an IPTV network if the AdDec data is to be inserted by the IPTV network Aserver. The present disclosure describes an illustrative embodiment of a system and method in which AdDec data is made available on a per-VHO basis, and is carried in per-VHO multicast streams. Each VHO and its clients receive only the AdDec data applicable to that VHO. This allows for much more VHO specific AdDec data to be delivered than is the case in the current MAP specifications. An illustrative embodiment will be described in the context of an IPTV network or system in which video data services, voice over internet protocol, internet data services and mobile/WiFi data connectivity are provided to end user client devices. In the IPTV network or system, IPTV video data (audio/visual data) are first multicast internet protocol (IP) packets from a server at a super hub office (SHO) to a regional or local IPTV video hub office (VHO). The IPTV system includes a hierarchically arranged network of routers and switches wherein the SHO transmits video and advertising data to a video hub office (VHO), and the VHO transmits to an IPTV router or switch closer to a subscriber. In another particular embodiment, the hierarchy consists of a SHO (super hub office), VHOs (video hub office), IOs (intermediate offices), COs central offices, and DSLAMS (digital subscriber line multiplexers) or passive optical subscriber line splitters/multiplexers which are interconnected with an IPTV transport network.

The IPTV transport may consist of routers and switches interconnected with high speed fiber optic and/or metallic cables for transmission of internet protocol (IP) data. The IPTV network also provides data communication for data and video associated with Internet and VoIP services to subscribers. IPTV channels are sent via Internet protocol (IP) multicast through the IPTV network hierarchy to the subscriber premises equipment, such as residential gateways (RGs) and IPTV client devices, such as set top boxes (STBs) or digital video recorders (DVRs).

A system is disclosed for inserting advertising decision data into an audio/visual data stream, the system including but not limited to a first server processor in data communication with a first computer program including but not limited to instructions embedded in a computer readable medium, wherein the processor is configured to insert advertising trigger signal data into the audio/visual data stream at a super head office (SHO) and send the audio/visual data stream with trigger signal data to an end user client device; and a second processor at a VHO, wherein the second processor is configured to receive the audio visual data stream and trigger signal data from the first processor, generate a per-VHO multicast data stream and inject advertising description data into the per-VHO multicast stream upon detection of the advertising trigger data in the audio/visual data stream and send the per-VHO multicast data stream from the VHO to the end user client device.

In another illustrative embodiment of the system the second processor further includes but is not limited to an AdDec server configured to run stage-1 R-UDP with the first processor, wherein the first processor further includes but is not limited to an Aserver, providing lost packet recovery between the first processor and the second processor. In another illustrative embodiment, the first processor sends the audio/visual data stream to a plurality of end user client devices and to a third processor and wherein the second processor sends the AdDec stream the plurality of end user client devices and the third processor. In another illustrative embodiment of the system the third processor further includes but is not limited to a Dserver and wherein an instant channel change function and a stage-2 R-UDP function both operate on the audio/visual data stream and the AdDec stream and the instant channel change function and the stage-2 R-UDP function are performed between the plurality of end user client devices and Dserver. In another illustrative embodiment of the system the AdDec stream is assigned a multicast group (G), which is the same multicast group G, as the audio/visual stream, but assigned a different source address (S), wherein in routers within the IPTV network, G is associated with both the Aserver source of the audio/visual stream and the AdDec server source of the AdDec stream, whereby the clients and Dserver automatically receive both the audio/visual stream and the AdDec stream without needing to be reconfigured from a system configuration wherein every VHO receives AdDec data for every other VHO in the audio/visual stream.

In another illustrative embodiment of the system the second processor generates the AdDec stream using real time protocol (RTP) sequence numbers that are offset from RTP sequence numbers for the audio/visual data stream so that the RTP sequence numbers for the AdDec stream are not considered duplicate RTP sequence numbers for the audio/visual data stream. In another illustrative embodiment of the system the AdDec server is implemented inside each of a pair of redundant Dservers, wherein the Dserver redundancy provides AdDec server redundancy. In another illustrative embodiment of the system the first processor inserts the ad trigger signal data into the audio/visual data stream and generates a separate VHO-specific AdDec multicast data stream for each of a plurality of VHOs. In another illustrative embodiment of the system a multicast group (G) for each AdDec stream is the audio/visual stream multicast group (G), and wherein in order to have a particular per-VHO AdDec stream delivered only to a VHO to which it applies, each AdDec stream for a TV channel is assigned a VHO-specific multicast source address (S), independent of an egress interface address for the Aserver. In another illustrative embodiment of the system routers in the IPTV network are configured to associate G with both the source of the audio/visual data stream and the source of the VHO-specific AdDec stream, so that the end user client devices and the Dserver will both receive both the audio/visual data stream and the AdDec data stream without needing to be reconfigured from a system configuration that delivers all of AdDec data in the audio/visual data stream to every VHO in the IPTV network. In another illustrative embodiment of the system the AdDec data that is applicable to all VHOs is inserted by the Aserver into the audio/visual stream and the per-VHO AdDec streams carries only VHO-specific data.

In another particular illustrative embodiment, a computer readable medium is disclosed containing an embedded computer program, that when executed by a dedicated processor performs functions that are useful for inserting advertising description data into an audio/visual data stream, the computer program including but not limited to instructions to insert advertising trigger signal data into the audio/visual data stream at a first server processor at a super head office (SHO) and send the audio/visual data and trigger signal data to an end user client device; and instructions to receive at a second processor, the audio visual data stream from the first processor; instructions at the second processor to generate a per-VHO multicast data stream and inject advertising description data into the per-VHO multicast stream upon detection of an advertising trigger data in the audio/visual data stream at a second processor at a VHO; and instructions to send the multicast data stream from the second processor to the end user client device. In another illustrative embodiment of the medium the second processor further includes but is not limited to an AdDec server configured to run stage-1 R-UDP with the first processor, wherein the first processor further includes but is not limited to an Aserver, the computer program further including but not limited to instructions to provide lost packet recovery between the first processor and the second processor.

In another illustrative embodiment of the medium the computer program further includes but is not limited to instructions to send the audio/visual data stream from the first processor to a plurality of end user client devices and instructions to send the AdDec stream to the plurality of end user client devices from a third processor and the second processor. In another illustrative embodiment of the medium the AdDec stream is assigned a multicast group (G), which is the same multicast group G, as the audio/visual stream, but assigned a different source address (S), and wherein G is associated with both the Aserver source of the audio/visual stream and the AdDec server source of the AdDec stream in routers within an internet protocol television network including the Aserver and the AdDec server, whereby the clients and Dserver automatically receive both the audio/visual stream and the AdDec stream without needing to be reconfigured from a system configuration wherein every VHO receives AdDec data for every other VHO in internet protocol television network. In another illustrative embodiment of the medium the computer program further including but not limited to instructions to generate the AdDec stream at the second processor using real time protocol (RTP) sequence numbers that are offset from RTP sequence numbers for the audio/visual stream so that the RTP sequence numbers for the AdDec stream are not considered duplicate RTP sequence numbers and associated packets dropped. In another illustrative embodiment of the medium the computer program further including but not limited to instructions to insert the ad trigger signal at the first processor into the audio/visual data stream and generate a separate VHO-specific AdDec multicast data stream for each of a plurality of VHOs.

In another illustrative embodiment of the medium the multicast group (G) of each AdDec stream is the same as the multicast group G for the audio/visual stream, and wherein in order to have a particular per-VHO AdDec stream delivered only to a VHO to which it applies, each AdDec stream for a given TV channel is assigned a VHO-specific multicast source address, independent of an egress interface address for the Aserver and wherein routers in the internet protocol television network are configured to associate G with both the source of the audio/visual data stream and the source of the VHO-specific AdDec stream, so that the clients and the Dserver will receive the audio/visual data stream and the AdDec data stream without needing to be reconfigured from a system that delivers all of AdDec data in the audio/visual data stream to every VHO in the IPTV network.

In another illustrative embodiment, a computer readable medium is disclosed containing an embedded computer program, the computer program comprising computer executable instructions that when executed by a dedicated processor performs functions that are useful for inserting advertising description data into an audio/visual data stream, the computer program including but not limited to instructions to insert advertising trigger signal data into the audio/visual data stream at a first server processor at a super head office (SHO); and instructions to receive the audio visual data stream from the first processor, instructions to generate a per-VHO multicast data stream and inject advertising description data into the per-VHO multicast stream upon detection of an advertising trigger data in the audio/visual data stream at a second processor at a VHO, wherein the second processor further includes but is not limited to and AdDec server configured to run stage-1 R-UDP with the first processor, wherein the first processor further includes but is not limited to an Aserver, the computer program further including but not limited to instructions to provide lost packet recovery between the first processor and the second processor and wherein the computer program further includes but is not limited to instructions to send the audio/visual data stream from the first processor to a plurality of client devices and instructions to send the AdDec stream the plurality of client devices from a third processor and the second processor.

In another illustrative embodiment of the medium the AdDec stream is assigned a multicast group (G), which is the same multicast group G, as the audio/visual stream, and assigned a different source address (S), wherein in routers within the internet protocol television network, G is associated with both the Aserver source of the audio/visual stream and the AdDec server source of the AdDec stream, whereby the clients and Dserver automatically receive both the audio/visual stream and the AdDec stream without needing to be reconfigured from a system configuration wherein every VHO receives AdDec data for every other VHO in the audio/visual stream.

In another particular illustrative embodiment, a Microsoft IPTV environment is provided with distribution servers (D-Servers) and an additional feature is provided in the advertising data insertion unit. R-UDP packet recovery protocol runs between the D-servers and the end user client devices. Furthermore, the internet protocol (IP) packets carry RTP (Real Time Protocol) packets within them. Various types of data are carried within the multicast streams and may be used for unique identification of streams for the purposes of lost packet recovery mechanisms. One example of this data is the SSRC field in the RTP header. In a particular illustrative embodiment, the client devices use the synchronization source (SSRC) in the real time transport protocol (RTP) header to identify streams.

Turning now to FIG. 1, in another particular embodiment an IPTV super hub office (SHO) 102 provides video data from an A-Server 114 to an Internet Protocol (IP) backbone network 118 which can be any IP multicast network, including but not limited to high speed fiber optics in combination with satellite and cellular/mobile communication networks or some other multicast our unicast communication network which provides the video data from a video source such as the SHO 102 to a regional video hub office (VHO) 101. The VHO 101 provides the video data to an intermediate office (TO) 122. As shown in FIG. 1, a first end user client device 124 is associated with VHO 101 and a second end user client device 135 is associated with a second VHO 101a. Each VHO 101, 101a, 101b communicates with client device 124, 135 and 137 respectively. Each of the A/V encoder 116, SHO 102, VHO 101, IO 122, ODR 120, IO router 122, A-server 114, D-server 110, advertising insertion unit, and end user devices (client devices) shown in FIG. 1 include a processor 123, computer readable medium 125, memory, data structures/data base 127 embedded in the computer readable medium and computer programs including computer executable instructions embedded in the computer readable medium.

Several particular illustrative embodiments for generation and delivery of per-VHO AdDec data are described herein. In a first illustrative embodiment, the Aserver inserts the advertising trigger signal into the audio/visual (A/V) stream 133, but not the AdDec data. Instead, VHO-specific AdDec data is injected into a per-VHO multicast stream 121 by an AdDec server 112 in each VHO. Injection of per-VHO AdDec data occurs when the AdDec server detects the advertising trigger (i.e., advertising trigger data) in the A/V stream. The clients and Mediaroom Dservers receive the A/V and AdDec streams. ICC and stage-2 R-UDP, required functions which operate between the client and Dserver, also operate on both streams. The AdDec server 112 also runs stage-1 R-UDP with the SHO Aserver, providing lost packet recovery for the part of the IPTV network between the AdDec Server and the SHO processor/server. The AdDec stream uses the same multicast group (G) as the A/V stream, but a different source address (S). In the routers within the IPTV network, this G is associated with both the source of the A/V stream (from the Aserver) and the source of the AdDec stream (AdDec server). In this way, the clients and Dserver automatically receive both streams without needing to be reconfigured. The AdDec stream uses RTP sequence numbers that are offset from those of the A/V stream, otherwise the AdDec stream RTP sequence numbers would be considered duplicates of the A/V and would be dropped. In one implementation of this alternative illustrative embodiment, the AdDec server is a stand-alone server.

Figure 2:
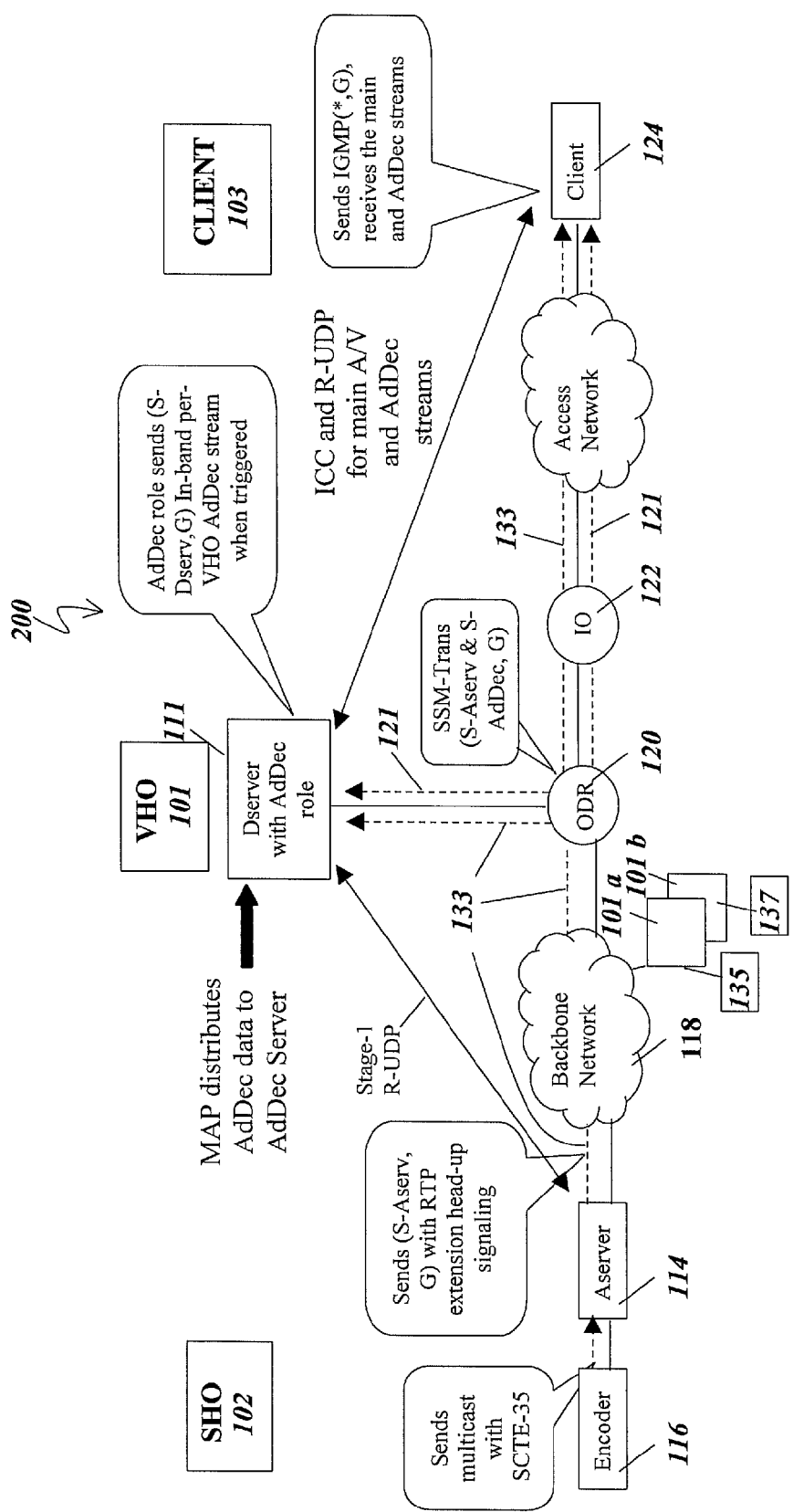
FIG. 2 depicts an illustrative embodiment of a system for delivering advertising data.

Turning now to FIG. 2, in another implementation, the AdDec server is not a separate equipment or machine but is implemented as a new function inside the Dserver. In this alternative, the data flows are simplified, and Dserver redundancy also provides AdDec server redundancy.

In this alternative, the function of the AdDec server is incorporated into the Dserver as an enhanced Dserver 111. As in the first illustrative embodiment, the multicast group (G) of each AdDec stream is the same as that of its A/V stream. In order to have a particular per-VHO AdDec stream delivered only to the VHO to which it applies, each AdDec stream for a given TV channel has a VHO-specific multicast source address, independent of the Aserver egress interface address. This capability already exists in the Aservers and has been implemented for the A/V streams. The routers in the network are configured to associate the multicast G with both the source of the A/V stream and the source of the VHO-specific AdDec stream, so the clients and Dserver will receive both streams without needing to be reconfigured. As in the first illustrative embodiment, the AdDec stream uses RTP sequence numbers that are offset from those of the live TV stream.

Referring to FIG. 2, in a second illustrative embodiment, the Aserver inserts the ad trigger signal into the A/V stream 133; and it generates a separate VHO-specific AdDec multicast stream 121 for each VHO A substantial portion of the MAP SAI advertising decision (AdDec) data is expected to be different for each VHO. In some prior MAP SAI architectures, the SHO Aserver inserts ad decision data for all VHOs into the same stream that carries the A/V. With this approach, the same aggregated ad decision data of all the VHOs is distributed via IP multicast to every VHO. The result is that each VHO receives its own ad decision data as well as the data for all the other VHOs. However, the amount of data (or bandwidth) available for carrying this data is limited. This means the amount of ad decision data for each VHO needs to be restricted, or the number of VHOs that can participate must be restricted, or both. This is not scalable to meet increased ad insertion requirements. Creating ad decision data for each VHO and distributing that data only to the VHO to which it applies would be much more efficient and scalable. This presentation describes architecture alternatives for creation of per-VHO ad decision data and for delivery of that data only to the VHOs to which it applies.

Several illustrative embodiments are described herein. Turning again to FIG. 1, in a first illustrative embodiment, AdDec data is carried in separate AdDec streams for each VHO, and these streams are generated by an AdDec server in each VHO. In the first illustrative embodiment, an AdDec server is a standalone server. In a second illustrative embodiment, the AdDec is implemented as a role within existing Mediaroom D-servers structure and software. In a third illustrative embodiment, AdDec data is carried in separate AdDec streams for each VHO, and all these streams are generated by the SHO Aserver.

The stream from the SHO Aserver includes the "headsup" signal carried in the payload of specific types of RTP packets. The headsup is sent out earlier than the "splice now" signal, in order to allow the client to prepare the ads for insertion into the A/V stream. The headsup signal and splice now signal are generated by the Aserver based on reception of SCTE35 signals, which were generated in upstream elements. In the first illustrative embodiment, no Ad Decision (AdDec) data is inserted by the SHO Aserver. Instead, per-VHO AdDec data is provided in a separate multicast stream from a VHO AdDec server. The AdDec stream has the same multicast G as the Aserver stream, but different source. The VHO AdDec server may be implemented as a stand alone server (first alternative in the first illustrative embodiment), or as an AdDec role in the Dserver (second alternative of the first illustrative embodiment). In either case, the AdDec server is populated by MAP with per-VHO Ad Decision data. The VHO AdDec server receives Aserver multicast and looks for the headsup signal. The headsup signal triggers sending the per-VHO AdDec multicast stream. The VHO AdDec server Runs stage-1 R-UDP for packet recovery.

Returning to FIG. 1, as shown in FIG. 1, in a particular illustrative embodiment, each RTP packet has a sequence number (sequence number) field within its header. The device that generates the RTP stream increments the sequence number by one for each packet it sends out. The purpose of the sequence number is to allow the device that receives the packet to detect if packets were lost or duplicated in the network between the sender and receiver. Sequence numbers for the AdDec stream are offset from those of the main A/V stream (e.g. by 32K), so they will not be considered duplicates of packets in the main stream. The client sends IGMP (*,G) and subsequently receives the main stream and the AdDec stream. IGMP is a standard multicast protocol that allows a device to send a request to the router to which it is attached, requesting reception of multicast packets which have multicast group G. The ICC and stage-2 R-UDP include both streams. ICC is Microsoft's Mediaroom system that provides for "instant channel change" capability.

Stage-2 R-UDP is the Mediaroom system for recovery of packets lost between the clients and the multicast source. The Dserver sends IGMP(*,G) and receives and buffers the main A/V stream, provides ICC and stage-2 R-UDP to the clients for the main A/V stream and the AdDec stream. When the AdDec server is a stand alone server, the Dserver receives and buffers the AdDec stream. Packet loss between the Dserver and AdDec server is insignificant when attached to the same router. When the AdDec role resides in the Dserver, the Dserver becomes the source of the AdDec stream. AdDec redundancy is provided by Dserver redundancy.

SSM-translate is configured so clients receive both the Aserver and AdDec streams. In a particular illustrative embodiment, SSM-translate is configured so the Dserver receives both the Aserver and AdDec streams. In another illustrative embodiment, SSM-translate is configured so the Dserver receives only the Aserver stream. SSM-translate is a feature which provides a multicast source address, whose value is configurable, with the multicast group G, when an IGMP request arrives with a multicast G but no source (e.g. IGMP(*,G)).

A conceptual view of the first particular illustrative embodiment is provided in FIG. 1. Note that FIG. 1 shows the single SHO and the components in one of a plurality VHOs. There are actually many VHOs in the network, all of which are connected to the Backbone Network and receive national TV channels from the single SHO. A conceptual view of the second particular illustrative embodiment is depicted in the FIG. 2. FIG. 2 depicts the SHO and the components in one VHO in a particular illustrative embodiment. There are actually many VHOs in the IPTV network, all of which are connected to the Backbone Network and receive national TV channels from the single SHO.

Figure 3:
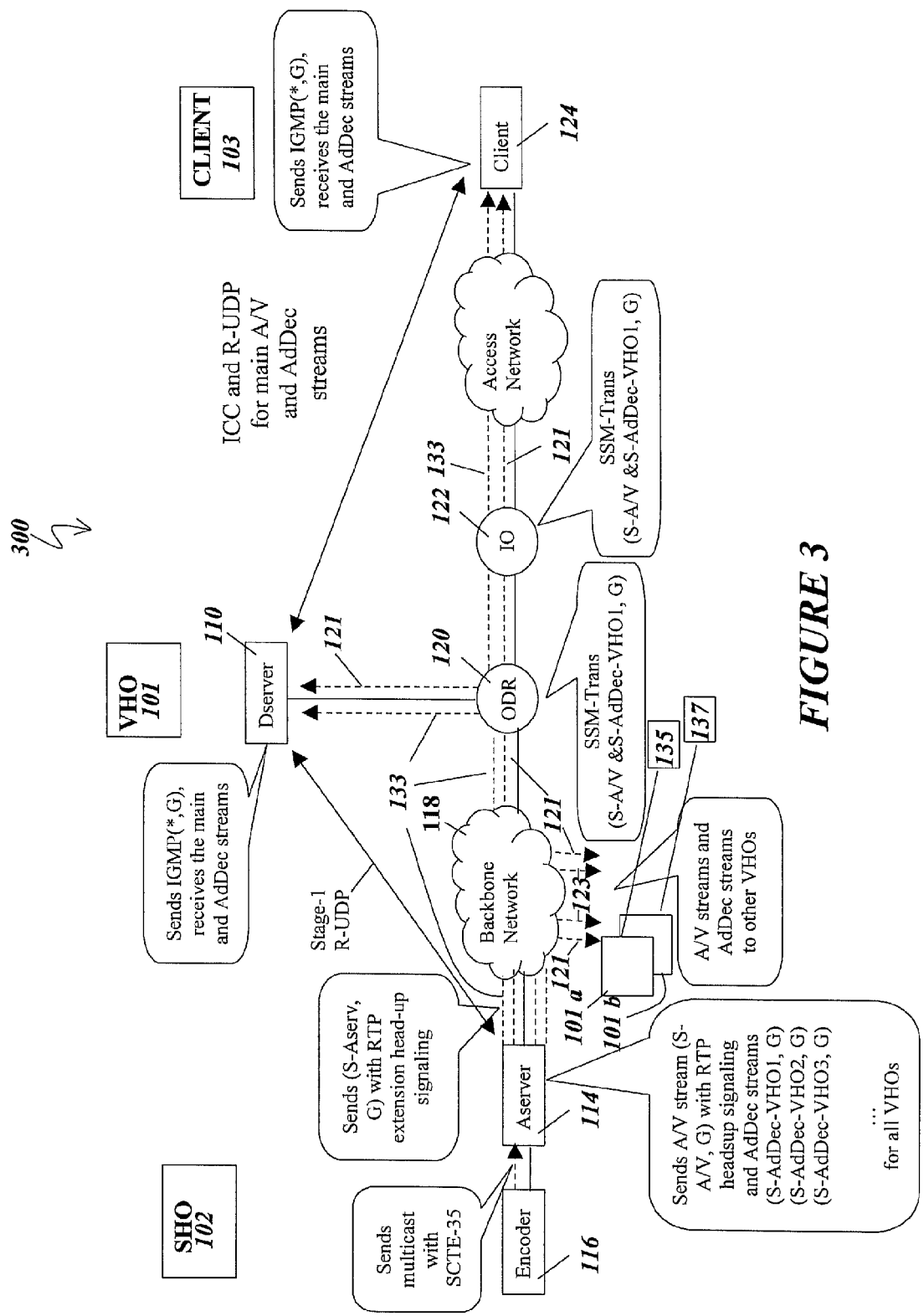
FIG. 3 depicts an illustrative embodiment of a system for delivering advertising data.

In the illustrative embodiment depicted in FIG. 3, the SHO Aserver generates the main A/V stream and associated per-VHO AdDec streams for all the ad insertion VHOs. Each per-VHO AdDec stream has the same multicast group (G) as the main A/V stream, but a separate multicast source address (S). This relies on the ability of the Aserver to generate AdDec streams with virtual multicast source addresses, which are separate from the Aserver's egress interface address. In order to deliver each per-VHO AdDec stream only to its VHO, SSM-Translate is configured in each VHO to map G to the source (the virtual source address) of the AdDec stream for that VHO.

As in the illustrative embodiment, discussed above, the RTP sequence numbers of each AdDec stream are offset from those of its main A/V stream (e.g. by 32K), so not dropped as duplicates of the main stream. The client still sends IGMP(*, G) and receives the main stream and the AdDec stream. The Dserver sends IGMP(*,G), receives and buffers the main stream and the per-VHO AdDec stream, and provides ICC and stage-2 R-UDP to the clients for the main A/V stream and the AdDec stream.

The Aserver and Dserver run stage-1 R-UDP for packet recovery for both the main A/V stream 133 and the AdDec stream 121. A conceptual view of the third illustrative embodiment is provided in FIG. 3. FIG. 3 shows the SHO and the components in one VHO. There are actually many VHOs in the network, all of which are connected to the Backbone Network and receive national TV channels from the single SHO. Excessive bandwidth bursts due to the AdDec streams when ad insertion is triggered can be ameliorated by inserting AdDec data separately for each slot of the avail, instead of all at the beginning of the avail. Explicit spreading out of the insertion of the AdDec data by the Aserver, such as by introducing a gap between the insertion times. For example, if the pre-roll time of a particular channel is 9 sec, and 6 sec are required to prepare for splicing after receiving the AdDec data, then insertion of the per-VHO AdDec data can be spread out over 3 sec. For different channels the splice times are not precisely synchronized. The pre-roll times are spread out.

In a particular illustrative embodiment, there are at least two nominal pre-roll times. For many channels, actual pre-roll times differ from the nominal, due to per-channel pre-roll adjustments in upstream elements. With this enhancement, a distinction is made between universal AdDec data, which is equally applicable to all VHOs, and VHO-specific (per-VHO) AdDec data. This would be useful when a significant percentage of the AdDec data applies equally to all VHOs. This approach eliminates the replication of universal AdDec data to all the VHOs. Universal AdDec data is carried in the A/V stream, and it is naturally multicast to all the VHOs. Per-VHO data is carried in separate multicast streams, with each VHO receiving only its own stream. This enhancement is applicable to all of the alternatives described previously.

Figure 4:
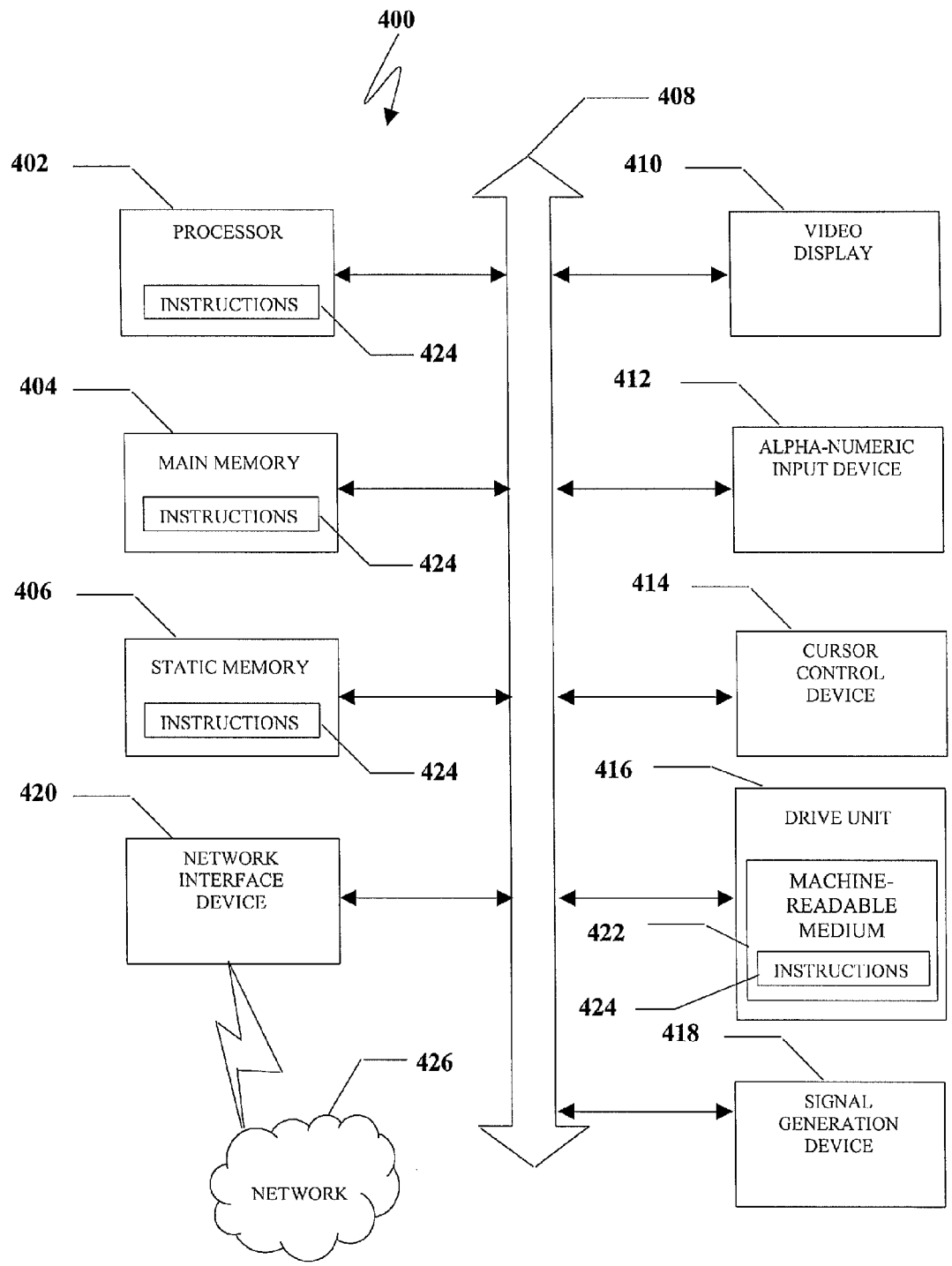
FIG. 4 depicts an illustrative embodiment of a machine for performing functions disclosed in an illustrative embodiment.

FIG. 4 is a diagrammatic representation of a machine in the form of a computer system 400 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., liquid crystals display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface.

The disk drive unit 416 may include a machine-readable medium 422 on which is stored one or more sets of instructions (e.g., software 424) embodying any one or more of the methodologies or functions described herein, including those methods illustrated in herein above. The instructions 424 may also reside, completely or at least partially, within the main memory 404, the static memory 406, and/or within the processor 402 during execution thereof by the computer system 400. The main memory 404 and the processor 402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420. The machine readable medium may also contain a data structure for containing data useful in providing a functional relationship between the data and a machine or computer in an illustrative embodiment of the disclosed system and method.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for inserting advertising description data into an audio/visual data stream, the system comprising:
   a first server processor in data communication with a first computer program comprising instructions embedded in a tangible non-transitory computer readable medium, wherein the computer program comprises:
   instructions to insert advertising trigger signal data into the audio/visual data stream at a super head office indicating an advertising avail for insertion of advertising data;
   instructions to receive at a first server processor a heads up message from a super head office server;
   instructions to determine at the first server processor, based on the heads up message, a pre-roll time for a channel in the data stream for each of a plurality of advertising slots in the advertising avail;
   instructions to determine a time needed to prepare for splicing advertising data into the data stream for each of the plurality of slots in the advertising avail;
   instructions to determine a difference time between the pre-roll time for the advertising avail and the time needed to prepare for splicing for each slot in the advertising avail;
   instructions to reduce a bandwidth burst for inserting the advertising data into the plurality of slots in the advertising avail by spreading each of a plurality of splicing insertion times for the each of the plurality of slots over the difference time for each slot in the advertising avail;
   instructions to send the audio/visual data stream with trigger signal data to an end user client device;
   and
   a second processor at a VHO, wherein the second processor is configured to receive the audio visual data stream and trigger signal data from the first processor, generate a per-VHO multicast data stream and inject advertising description data into the per-VHO multicast stream upon detection of the advertising trigger data in the audio/visual data stream and send the per-VHO multicast data stream from the VHO to the end user client device, wherein the advertising description data is inserted separately for each slot in the advertising avail at the beginning of each slot in each advertising avail in the audio visual advertising stream.

2. The system of claim 1, wherein the second processor further comprises an AdDec server configured to run stage-1 R-UDP with the first processor, wherein the first processor further comprises an Aserver, providing lost packet recovery between the first processor and the second processor, wherein there insertion of advertising description data is spread out by introducing a gap between the insertion times.

3. The system of claim 2, wherein the first processor sends the audio/visual data stream to a plurality of end user client devices and to a third processor and wherein the second processor sends the AdDec stream the plurality of end user client devices and the third processor, wherein in response to a pre-roll time for a particular channel being a first quantity of seconds and a second quantity seconds being required to prepare for splicing after receiving the inserted advertising description data, the insertion is spread out over a third quantity of seconds by which the first quantity of seconds exceeds the second quantity of seconds.

4. The system of claim 3, wherein the third processor further comprises a Dserver and wherein an instant channel change function and a stage-2 R-UDP function both operate on the audio/visual data stream and the AdDec stream and the instant channel change function and the stage-2 R-UDP function are performed between the plurality of end user client devices and Dserver.

5. The system of claim 4, wherein, the AdDec stream is assigned a multicast group (G), which is the same multicast group G, as the audio/visual stream, but assigned a different source address (S), wherein in routers within the IPTV network, G is associated with both the Aserver source of the audio/visual stream and the AdDec server source of the AdDec stream, whereby the clients and Dserver automatically receive both the audio/visual stream and the AdDec stream without being reconfigured from a system configuration wherein every VHO receives AdDec data for every other VHO in the audio/visual stream.

6. The system of claim 5, wherein second processor generates the AdDec stream using real time protocol (RTP) sequence numbers that are offset from RTP sequence numbers for the audio/visual data stream so that the RTP sequence numbers for the AdDec stream are not considered duplicate RTP sequence numbers for the audio/visual data stream.

7. The system of claim 6, wherein the AdDec server is implemented inside each of a pair of redundant Dservers, wherein the Dserver redundancy provides AdDec server redundancy.

8. The system of claim 1, wherein the first processor inserts the ad trigger signal data into the audio/visual data stream and generates a separate VHO-specific AdDec multicast data stream for each of a plurality of VHOs.

9. The system of claim 8, wherein a multicast group (G) for each AdDec stream is the audio/visual stream multicast group (G), and wherein in order to have a particular per-VHO AdDec stream delivered only to a VHO to which it applies, each AdDec stream for a TV channel is assigned a VHO-specific multicast source address (S), independent of an egress interface address for the Aserver.

10. The system of claim 9, wherein routers in the IPTV network are configured to associate G with both the source of the audio/visual data stream and the source of the VHO-specific AdDec stream, so that the end user client devices and the Dserver will both receive both the audio/visual data stream and the AdDec data stream without needing to be reconfigured from a system configuration that delivers all of AdDec data in the audio/visual data stream to every VHO in the IPTV network.

11. The system of claim 1, wherein AdDec data that is applicable to all VHOs is inserted by the Aserver into the audio/visual stream and the per-VHO AdDec streams carries only VHO-specific data.

12. A tangible non-transitory computer readable medium containing an embedded computer program, that when executed by a dedicated processor performs functions that are useful for inserting advertising description data into an audio/visual data stream, the computer program comprising:
  instructions to receive at a first server processor a heads up message from a super head office server;
  instructions to determine at the first server processor, based on the heads up message, a pre-roll time for each of a plurality of slots in an advertising avail in a channel in the data stream;
  instructions to determine a time needed to prepare for splicing advertising data for each of the plurality of slots in the advertising avail into the data stream;
  instructions to determine a difference time between the pre-roll time and the time needed to prepare for splicing for each of the plurality of slots in the advertising avail;
  instructions to reduce a bandwidth burst for inserting the advertising data into the plurality of slots in the advertising avail by spreading each of a plurality of splicing insertion times for the each of the plurality of slots insertion times for the each of the plurality of slots over the difference time;
  instructions to insert advertising trigger signal data into the audio/visual data stream at a first server processor at the super head office and send the audio/visual data and trigger signal data to an end user client device; and
  instructions to receive at a second processor, the audio visual data stream from the first processor;
  instructions at the second processor to generate a per-VHO multicast data stream and inject advertising description data into the per-VHO multicast stream upon detection of an advertising trigger data in the audio/visual data stream at a second processor at a VHO, wherein the advertising description data is inserted separately for each available advertising avail at the beginning of each advertising avail in the audio visual advertising stream; and
  instructions to send the multicast data stream from the second processor to the end user client device.

13. The medium of claim 12, wherein the second processor further comprises an AdDec server configured to run stage-1 R-UDP with the first processor, wherein the first processor further comprises an Aserver, the computer program further comprising instructions to provide lost packet recovery between the first processor and the second processor, wherein there insertion of advertising description data is spread out by introducing a gap between the insertion times.

14. The medium of claim 13, wherein the computer program further comprises instructions to send the audio/visual data stream from the first processor to a plurality of end user client devices and instructions to send the AdDec stream the plurality of end user client devices from a third processor and the second processor, wherein in response to a pre-roll time for a particular channel being a first quantity of seconds and a second quantity seconds being required to prepare for splicing after receiving the inserted advertising description data, the insertion is spread out over a third quantity of seconds by which the first quantity of seconds exceeds the second quantity of seconds.

15. The medium of claim 14, wherein, the AdDec stream is assigned a multicast group (G), which is the same multicast group G, as the audio/visual stream, but assigned a different source address (S), and wherein G is associated with both the Aserver source of the audio/visual stream and the AdDec server source of the AdDec stream in routers within an internet protocol television network including the Aserver and the AdDec server, whereby the clients and Dserver automatically receive both the audio/visual stream and the AdDec stream without being reconfigured from a system configuration wherein every VHO receives AdDec data for every other VHO in internet protocol television network.

16. The medium of claim 15, the computer program further comprising instructions to generate the AdDec stream at the second processor using real time protocol (RTP) sequence numbers that are offset from RTP sequence numbers for the audio/visual stream so that the RTP sequence numbers for the AdDec stream are not considered duplicate RTP sequence numbers and associated packets dropped.

17. The medium of claim 13, the computer program further comprising instructions to insert the ad trigger signal at the first processor into the audio/visual data stream and generate a separate VHO-specific AdDec multicast data stream for each of a plurality of VHOs.

18. The medium of claim 15, wherein the multicast group (G) of each AdDec stream is the same as multicast group G for the audio/visual stream, and wherein in order to have a particular per-VHO AdDec stream delivered only to a VHO to which it applies, each AdDec stream for a given TV channel is assigned a VHO-specific multicast source address, independent of an egress interface address for the Aserver and wherein routers in the internet protocol television network are configured to associate G with both the source of the audio/visual data stream and the source of the VHO-specific AdDec stream, so that the clients and the Dserver will receive the audio/visual data stream and the AdDec data stream without needing to be reconfigured from a system that delivers all of AdDec data in the audio/visual data stream to every VHO in the IPTV network.

19. A non-transitory computer readable medium containing an embedded computer program, that when executed by a dedicated processor performs functions that are useful for inserting advertising description data into an audio/visual data stream, the computer program comprising:
instructions to receive at a first server a heads up message from a super head office server;
instructions to determine at the first server, based on the heads up message, a pre-roll time for each of a plurality of slots in the advertising avail in a channel in the data stream;
instructions to determine a time needed to prepare for splicing advertising data into the data stream for each of the plurality of slots in the advertising avail;
instructions to determine a difference time between the pre-roll time and the time needed to prepare for splicing for each of the plurality of slots in the advertising avail;
instructions to reduce a bandwidth burst for inserting the advertising data into the plurality of slots in the advertising avail by spreading each of a plurality of splicing insertion times for the each of the plurality of slots over the difference time for each slot in the advertising avail;
instructions to insert advertising trigger signal data into the audio/visual data stream at a first server processor at a super head office (SHO); and
instructions to receive the audio visual data stream from the first processor, instructions to generate a per-VHO multicast data stream and inject advertising description data into the per-VHO multicast stream upon detection of an advertising trigger data in the audio/visual data stream at a second processor at a VHO, wherein the advertising description data is inserted separately for each for each slot in the advertising avail available advertising avail at the beginning of each advertising avail in the audio visual advertising stream, wherein there insertion of advertising description data is spread out by introducing a gap between the insertion times, wherein the second processor further comprises and AdDec server configured to run stage-1 R-UDP with the first processor, wherein the first processor further comprises an Aserver, the computer program further comprising instructions to provide lost packet recovery between the first processor and the second processor and wherein the computer program further comprises instructions to sends the audio/visual data stream from the first processor to a plurality of client devices and instructions to send the AdDec stream the plurality of client devices from a third processor and the second processor.

20. The medium of claim 19, wherein, the AdDec stream is assigned a multicast group (G), which is the same multicast group G, as the audio/visual stream, and assigned a different source address (S), wherein in routers within the internet protocol television network, G is associated with both the Aserver source of the audio/visual stream and the AdDec server source of the AdDec stream, whereby the clients and Dserver automatically receive both the audio/visual stream and the AdDec stream without being reconfigured from a system configuration wherein every VHO receives AdDec data for every other VHO in the audio/visual stream, wherein in response to a pre-roll time for a particular channel being a first quantity of seconds and a second quantity seconds being required to prepare for splicing after receiving the inserted advertising description data, the insertion is spread out over a third quantity of seconds by which the first quantity of seconds exceeds the second quantity of seconds.

* * * * *